June 19, 1951     E. B. ANDERSON     2,557,776
FISHING LINE SINKER
Filed May 4, 1949
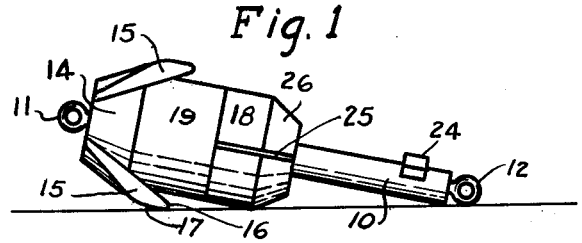
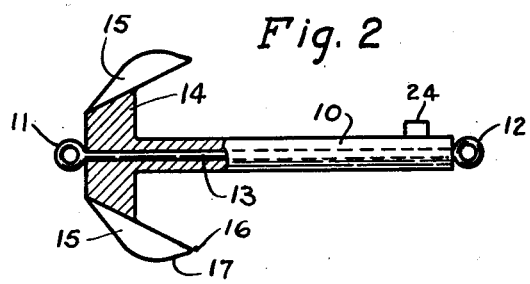
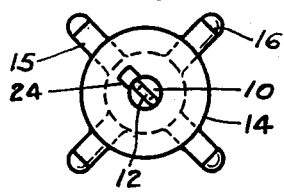 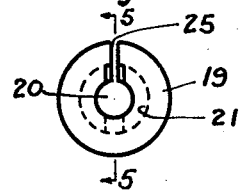
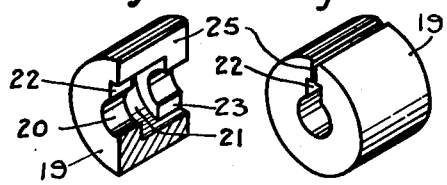 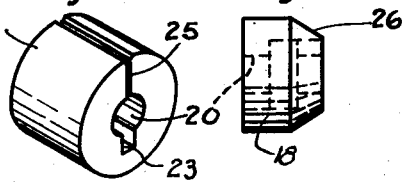
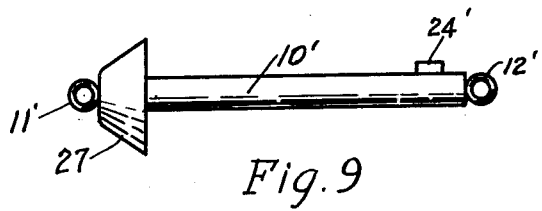
INVENTOR.
Edward B. Anderson
BY
Barr, Borden & Fox Patented June 19, 1951

2,557,776

UNITED STATES PATENT OFFICE 2,557,776

FISHING LINE SINKER

Edward B. Anderson, Wilmington, Del.

Application May 4, 1949, Serial No. 91,331

3 Claims. (Cl. 43—43.14)

The present invention relates to fishing accessories and more particularly to a new and novel sinker for fishing lines.

Sinkers of the type to which this invention relates have heretofore been molded into solid shapes of various weights for substitution according to conditions at the time of use. The more general shape is the sinker known as the pyramid sinker in the form of a polygonal cone having an eye at the base for attachment of a fishing line or a leader. Sinkers of this type, unless too heavy for casting, have been found a source of considerable annoyance to fishermen using them in fast running water or strong tidal currents because where, several fishermen in the same boat, cast upstream against the current, the several respective sinkers drift with the current so that as the lines pass alongside of the boat they become entangled one with another to the discomfiture of all concerned.

Some of the objects of the present invention are: to provide an improved sinker; to provide a sinker capable of resisting drag when subjected to water currents ordinarily causing a sinker to drift; to provide a sinker having means to anchor it to the sand, mud or other bottom of a body of water, but which anchoring means is readily releasable at the will of the fisherman; to provide a sinker having means for varying the weight of the sinker without detaching it from the line or leader; to provide a novel weight attaching means to a sinker body; to provide a sinker wherein provision is made for using it as a line anchor or to follow the line when trolling or drifting; and to provide other improvements as will hereinafter appear.

In the accompanying drawings, Fig 1 represents a side elevation of a fishing line sinker embodying one form of the present invention, the same being shown in operative position; Fig. 2 represents a medial longitudinal section of the same with the weight elements removed; Fig. 3 represents an end elevation of the part shown in Fig. 2; Fig 4 represents a front elevation of one of the removable weight elements; Fig. 5 represents a section on line 5—5 of Fig 4 shown in perspective; Fig. 6 represents a perspective of one of the weight elements viewed from one face; Fig. 7 represents a perspective of the same element viewed from the opposite face; Fig. 8 represents a side elevation of an element as used for trolling; and Fig. 9 represents a side elevation of a modified form of the invention for use in trolling.

Referring to the drawings, one form of the present invention comprises an elongated stem 10, illustratively of circular cross section, terminating at opposite ends respectively in line or leader attaching eyes 11 and 12, which may be molded into the stem 10, but are preferably formed in the opposite ends of a wire 13 which is molded axially within the stem. By using this wire 13, the stem 10 receives reinforcement to counteract any tendency of the stem to bend or become distorted, particularly when it is made of lead. In close proximity to one of the eyes, and preferably formed as an integral part of the stem, there is a hub 14 forming an abutment and from which radiate a plurality of prongs 15, in the present instance four being shown and arranged ninety degrees apart about the periphery of the hub 14 and angularly disposed and extended to overlie the stem 10 in spaced relation thereto. Preferably the angularity and length of the prongs 15 is the same so that the four ends terminate in the same plane and consequently any pair in contact with the bottom of a body of water will simultaneously penetrate the bottom material and so anchor the sinker against drifting with strong currents, tidal or otherwise.

As shown, each prong 15 is of relatively narrow, uniform width radially considered, and terminates in a transverse sharp, biting edge 16 for digging into the ground bottom as an anchor to resist the force of a current. Also, it should be noted that each prong 15 tapers in thickness away from the hub 14, and merges by way of an arcuate portion into the base of the edge 16 to form a fulcrum point 17, about which the sinker can turn when a line-lifting force is applied to the eye 12. Thus, with the two edges 16 embedded in the sand and the fishing line (attached to eye 12) is lifted, the two prongs will be caused to turn about the two respective fulcrums and release the edges 16 from the sand so that the sinker can be easily retrieved.

In order to vary the weight of the sinker to meet various conditions, a plurality of attachable ring elements are provided, two being shown illustratively, and of different weight; thus element 18 is relatively light, and element 19 being heavier. As the means for mounting and attaching the several elements to the stem 10 is the same for each, this description will be directed to element 19 as illustrative of all. As shown in Figs. 4 to 7 inclusive, the element 19 has an axial hole 20 of such diameter as will snugly receive the stem 10 but allow free sliding movement to bring the element into abutting relation with the hub 14. Internally of the element and concentrically arranged therein is a groove 21 which intersects at two diametrically opposite locations two ways 22 and 23, the former (22) leading to one side face of the element and the other (23) to the opposite side face of the element. The way 22 is dimensioned to allow a lug 24 fixed to the stem 10 to pass freely through it and enter the groove 21, such lug 24 being complementally dimensioned with respect to the groove 21 so that having entered the groove 21 it will allow the element to be turned. The way 23 is also dimensioned to allow the passage of the lug 24 so that it leaves the groove 21 and makes it possible for the element 19 to ride into position upon the stem 10. Thus, in placing the weight elements on the stem, each is slipped over the end of the stem with its way 22 in register with the lug 24 and then moved to bring the lug 24 into the groove 21. Now the element is given a half turn so that the lug 24 comes into register with the way 23, whereupon the element is free to ride along the stem 10 to operative position while entirely guarded against improperly working off of the end of the stem and being lost.

For the purpose of allowing the weight elements to be placed on or removed from the stem without detaching the fishing line or leader from the eye 12, each is provided with a transverse slot 25 parallel to the axis of the element, and leading through to the hole 20', so that each element can pass the line as it is brought into register with the end of the stem 10.

In Fig. 8 the element 18 is shown as having a truncated end 26, thus making the element suitable for trolling with the sinker, its position being shown in Fig. 1. This construction functions to reduce turbulence or eddies as the sinker is drawn along.

In the forming of the invention shown in Fig. 9, the stem 10', eyes 11' and 12', and lug 24' are constructed as described for the preferred form of the invention, but the sinker as modified is for use when trolling. Thus, the end adjacent the eye 11' is formed as an initial weight 27, of truncated shape having sides converging toward the eye 11' in order to create little water disturbance as it is drawn along by the moving boat. In this form, the flat base of the weight 27 serves as an abutment to seat an added weight and has a diameter equal to the diameter of that weight or any other elements so that the resulting contour is substantially that of a cylinder leading to the last element which is contoured similar to the element 18, shown in Fig. 8. Thus, the trolling form provides for oppositely disposed truncated ends also functioning to reduce water turbulence.

It will now be apparent that a complete unitary sinker has been devised wherein provision is made for meeting all adverse conditions of tides, currents and the like when on the bed of a body of water. Thus, the weight of the sinker can be varied according to requirements so that a single sinker is all that is needed in a tackle box with a minimum of additional weights instead of a large number of separate sinkers each of different weight. Furthermore, attention is directed to the novel anchoring action which functions automatically under a current force acting to pull the line in a direction to cause the edges of the prongs to anchor in the bottom, while such anchoring can be released by applying a lifting force to the eye end of the sinker. While generally the fishing line or leader will be attached to the eye 12 to prevent drifting, it can be connected to the eye 11 instead of eye 12, whereupon the sinker is adapted for drifting and its movement facilitated by the reversely shaped cone of the end weight.

When using the sinker of Fig. 9, the line is connected to either the eyes 11' or 12' respectively for trolling operation.

Having thus described my invention, I claim:

1. A sinker for fishing lines comprising a stem, a radially disposed lug on said stem, an eye at one end of said stem, an abutment at the other end of said stem and an annular weight element for telescopically mounting on said stem, said element having an axially disposed hole to receive said stem, an inner circumferential groove and two angularly spaced ways communicating respectively with said hole and said groove, one of said ways opening at one face of said element and the other way opening at the opposite face of said element and said lug being dimensioned to pass through both ways successively as said element is moved axially of said stem and turned to bring said ways successively into register with said lug.

2. A sinker for fishing lines, comprising a stem, means at one end of said stem for attaching a fishing line, means at the other end of said stem forming an abutment, a radially disposed lug on said stem adjacent said line attaching end and a weight to be positioned between said abutment and said lug having an axial hole for permitting turning and axial sliding of said weight relative to said stem, said weight having diagonally opposed recesses for receiving said lug for sliding movement along said stem and for permitting turning movement relative to said stem, whereby said weight can be manually positioned between said abutment and said lug by axial and turning movements relative to said stem.

3. A sinker for fishing lines, comprising a stem, means at one end of said stem for attaching a fishing line, means at the other end of said stem forming an abutment, a radially disposed lug on said stem adjacent said line attaching end and a weight to be positioned between said abutment and said lug having an axial hole for permitting turning and axial sliding of said weight relative to said stem, said weight having a radial slot for the passage of a fishing line into said hole, said weight having diagonally opposed recesses for receiving said lug for sliding movement along said stem and for permitting turning movement relative to said stem, whereby said weight can be manually positioned between said abutment and said lug by axial and turning movements relative to said stem.

EDWARD B. ANDERSON.

REFERENCES CITED

The following references are of record in the file of this patent:

UNITED STATES PATENTS

| Number | Name | Date |
| --- | --- | --- |
| D. 118,869 | Tower | Feb. 6, 1940 |
| 77,774 | Smith | May 12, 1868 |
| 481,462 | Benson | Aug. 23, 1892 |
| 549,332 | Sewell | Nov. 5, 1895 |
| 1,282,681 | Faribault | Oct. 22, 1918 |
| 1,339,697 | England | May 11, 1920 |
| 2,033,683 | Clark | Mar. 10, 1936 |
| 2,121,279 | Beck | June 21, 1938 |
| 2,177,007 | Smith | Oct. 24, 1939 |
| 2,250,038 | Sink | July 22, 1941 |